United States Patent [19]
Ford

[11] Patent Number: 5,927,553
[45] Date of Patent: *Jul. 27, 1999

[54] POWDERED BEVERAGE MIXING AND DISPENSING APPARATUS

[75] Inventor: David F. Ford, Springfield, Ill.

[73] Assignee: Bunn-o-matic Coporation, Springfield, Ill.

[ * ] Notice: This patent is subject to a terminal disclaimer.

[21] Appl. No.: 08/835,270

[22] Filed: Apr. 8, 1997

Related U.S. Application Data

[63] Continuation-in-part of application No. 08/685,702, Jul. 24, 1996.

[51] Int. Cl.$^6$ ........................................................ B67D 5/56
[52] U.S. Cl. .................. 222/129.4; 222/113; 222/146.5; 222/236; 222/241
[58] Field of Search ............................. 222/146.2, 146.5, 222/129.1, 129.3, 129.4, 113, 236, 241

[56] References Cited

U.S. PATENT DOCUMENTS

| | | |
|---|---|---|
| 2,658,645 | 1/1953 | Harris, Jr. . |
| 2,921,605 | 1/1960 | Booth et al. .......................... 222/129.1 |
| 3,199,738 | 8/1965 | Cary et al. ............................ 222/129.1 |
| 3,266,670 | 8/1966 | Brooks et al. ........................ 222/129.1 |
| 3,268,119 | 8/1966 | Kopera ................................. 222/129.1 |
| 3,300,094 | 1/1967 | Rockola ................................ 222/129.4 |
| 3,385,569 | 5/1968 | Bookout ................................ 222/129.4 |
| 3,446,137 | 5/1969 | Pryor et al. . |
| 3,568,887 | 3/1971 | Jacobs et al. ..................... 222/129.4 X |
| 3,655,097 | 4/1972 | Booth et al. ........................ 222/129.4 |
| 3,671,020 | 6/1972 | Krup .................................... 222/129.4 |
| 3,737,076 | 6/1973 | Gardner, Jr. et al. ............. 222/129.4 X |
| 4,015,749 | 4/1977 | Arzberger et al. ............... 222/129.4 X |
| 4,068,781 | 1/1978 | Toth . |
| 4,139,125 | 2/1979 | Arzberger et al. .................... 222/129.4 |
| 4,172,669 | 10/1979 | Edelbach .......................... 222/129.4 X |
| 4,194,651 | 3/1980 | Martin et al. ........................... 222/108 |
| 4,207,995 | 6/1980 | Neely ..................................... 222/236 |
| 4,319,698 | 3/1982 | Tomiyama et al. ................. 222/129.1 |
| 4,487,337 | 12/1984 | DeJardins .............................. 222/129.3 |
| 4,595,131 | 6/1986 | Ruskin et al. .................... 222/129.1 X |
| 4,676,401 | 6/1987 | Fox et al. .......................... 222/129.1 X |
| 4,688,474 | 8/1987 | Anderl . |
| 4,934,563 | 6/1990 | Torita et al. ........................ 222/236 X |
| 5,158,793 | 10/1992 | Helbling . |
| 5,192,002 | 3/1993 | Reese et al. ...................... 222/129.4 X |
| 5,303,639 | 4/1994 | Bunn et al. . |
| 5,312,020 | 5/1994 | Frei ...................................... 222/129.1 |
| 5,330,078 | 7/1994 | Ficken et al. ......................... 222/129.4 |
| 5,372,832 | 12/1994 | Bunn et al. . |
| 5,393,540 | 2/1995 | Bunn et al. . |
| 5,490,614 | 2/1996 | Sardynski ............................. 222/129.1 |

FOREIGN PATENT DOCUMENTS 2140390  4/1984  United Kingdom .

*Primary Examiner*—Kenneth Bomberg
*Attorney, Agent, or Firm*—Trexler, Bushnell, Giangiorgi & Blackstone, Ltd.

[57] ABSTRACT

A powdered beverage mixing and dispensing apparatus which combines a powdered beverage substance and water to produce a desired beverage, for example cappuccino, hot chocolate, as well as other beverages which may be provided in powdered form. The apparatus includes at least one hopper having a powdered beverage stirring and dispensing mechanism which stirs the powder to further prevent caking and to controllably dispense a desired quantity of powder from the hopper. A water dispensing system is coupled to the apparatus to controllably dispense a quantity of water for mixing with a quantity of powder dispensed from the hopper. A mixing assembly communicates with the hopper and with the water dispensing system to combine powder. A weir is positioned in a dispensing tube to minimize the face surface of the angle of repose of the powder in the tube. A vapor removal assembly is positioned between the mixing chamber and the hopper to remove moist air from the mixing assembly to reduce intrusion of such moist air into the hopper and absorption by the beverage powder. A dispensing nozzle is attached to the mixing assembly for directing the dispensing of a beverage into a container. A tip edge of the nozzle is positioned at an angle to prevent bubble formation thereover.

21 Claims, 7 Drawing Sheets

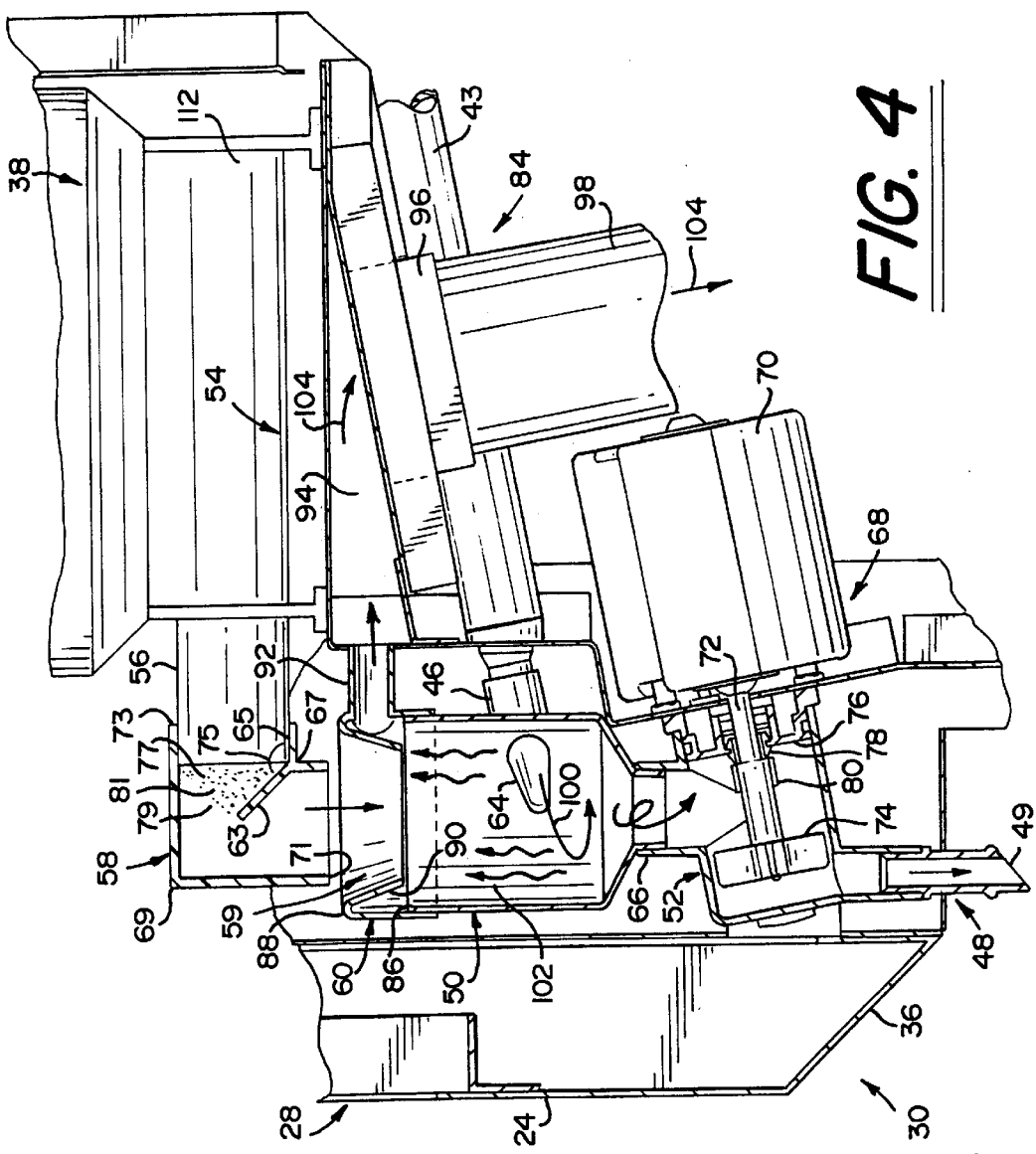
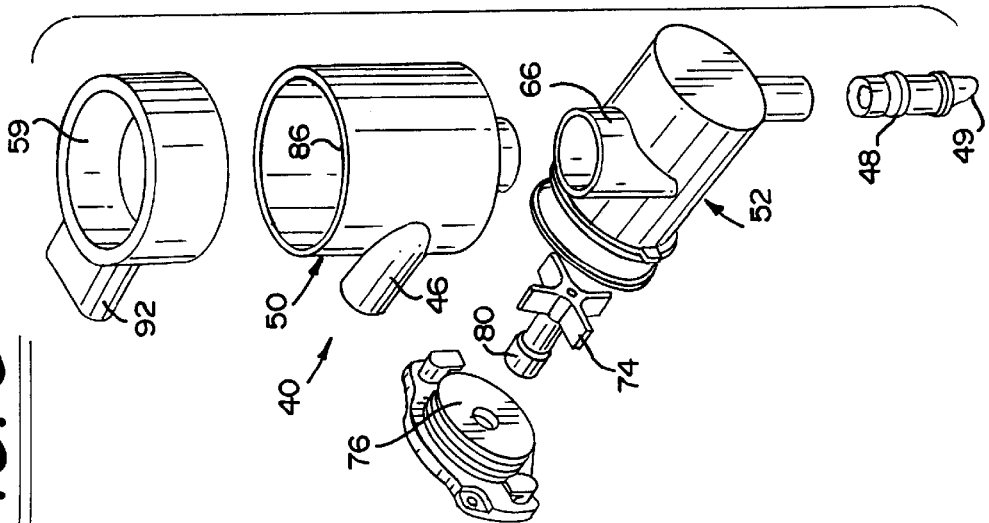

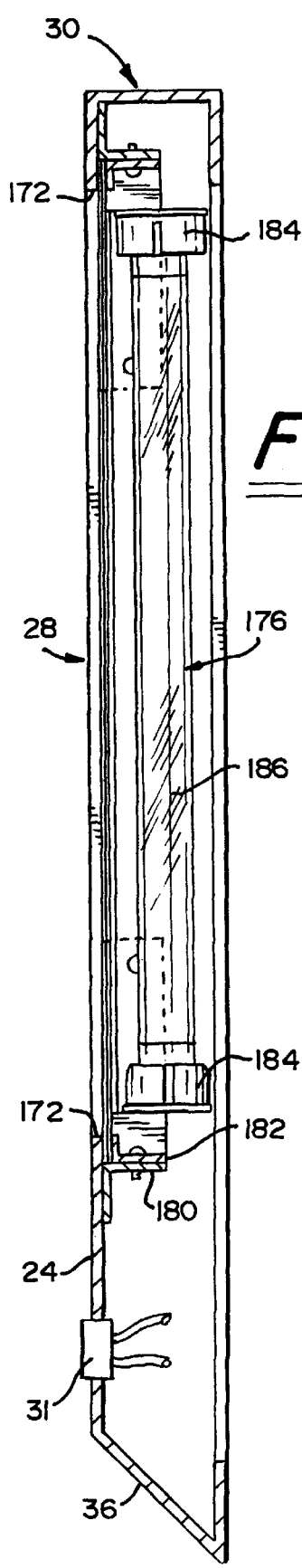
FIG. 9
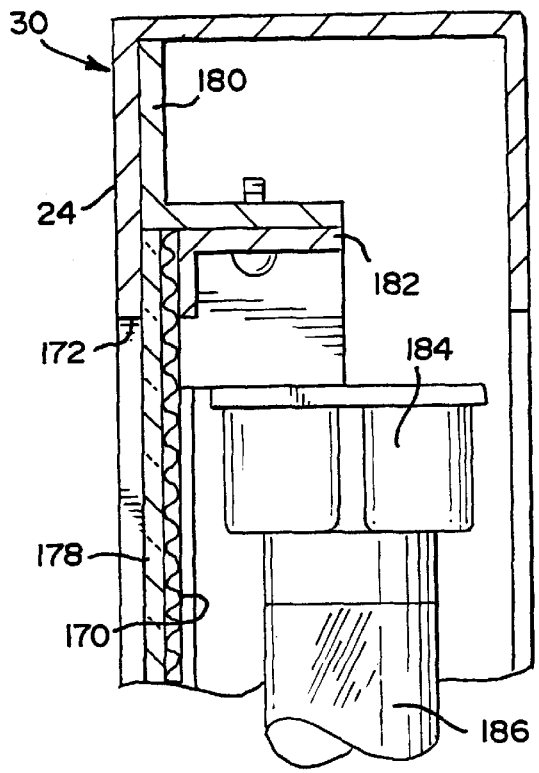
FIG. 10
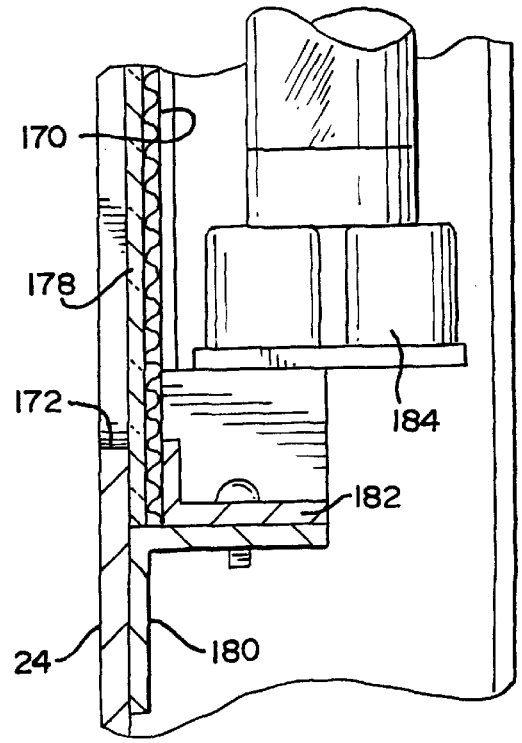

POWDERED BEVERAGE MIXING AND DISPENSING APPARATUS

CROSS REFERENCE

This patent application is a Continuation-in-Part of U.S. patent application Ser. No. 08/685,702 filed Jul. 24, 1996.

BACKGROUND

The present invention relates to a powdered beverage mixing and dispensing apparatus. The apparatus dispenses a powdered beverage substance and mixes it with water to produce a desired beverage.

Prior art beverage mixing devices encountered problems as a result of the powdered beverage substance forming clumps and cakes. The beverage substance powder is hydroscopic and thus readily absorbs moisture. Prior art beverage mixing devices typically used hot water and, as a result, produced steam or water vapor within the beverage apparatus. The entrapped water vapor was absorbed by the hydrophilic powder, resulting in caking of the powder. The caked or clumped powder tended to clog the hoppers and impede dispensing of the powder. As a result of the impeded powder dispensing, the beverage produced by such apparatus was inconsistent. Furthermore, the powder clumping problem required additional maintenance in order to break up the clumps and clear any dispensing tubes.

Another problem encountered with prior art powdered beverage dispensing mixing apparatus is that they tended to produce inconsistent beverages from the powdered beverage substance. One of the problems causing inconsistent beverages was the inability to thoroughly and effectively mix or blend the powder with a desired quantity of water to produce the resulting reconstituted beverage. Some prior art devices attempted to reconstitute beverage powders, for example hot cocoa mix powder, using only water forces to mix the powder with the water. In other words, water was injected into a mixing chamber and mixed with the beverage powder therein to produce the beverage. If variables associated with the water were altered, such as injection speed, the powder may not thoroughly mix and, as a result, produce an inconsistent beverage.

Additionally, prior art beverage apparatus did not produce a desired froth on top of the resultant beverage coffee drinks. For example, powdered beverage substances are available to produce cappuccino-type coffee beverages. In producing a cappuccino-type coffee beverage, it is desirable to have a layer of foam or froth on top of the beverage. This is desirable as it replicates the cappuccino beverages which are produced manually by the operator of a coffee bar. The coffee bar operator produces the froth by heating milk to produce a steamed and frothed milk substance which is poured over espresso to ultimately produce the cappuccino beverage. Prior art automatic beverage devices using powdered cappuccino beverage powder tended not to produce or inconsistently produce froth on top of the beverage produced from the beverage powder.

Another problem with the prior art beverage devices is that the mechanism which dispenses powder is prone to measuring inaccuracies. Part of the inaccuracy is caused by the angle of repose of the powder dispensed thereby. The powder tends to slide or fall and define an angle of repose. The size of the leading face of the powder flow contributes to the inaccuracies. The larger the leading face, the greater potential inaccuracies.

Prior art beverage mixing and dispensing apparatus also encountered problems with clumping and caking of the powder as a result of failing to mix or agitate the powder retained in the hopper. While some devices may have employed mixers or agitators within the hoppers, however, such mixers or agitators do not provide sufficient agitation of the powder to assure clump-free operation.

Prior art beverage mixing and dispensing apparatus dispense a beverage mixed thereby through a dispensing tube or nozzle. These dispensing nozzles have a tip that is spaced away from a cup positioned therebelow. The tip is generally defined by a straight cut across to end of the tube. In prior art devices, the straight cut tip tends to form a bubble on the end thereof upon the completion of a dispensing cycle. This bubble may rupture and splash into the cup, possibly splashing the patron of the device.

For the foregoing reasons, it would be desirable to provide a beverage mixing and dispensing apparatus which overcomes one or more of the above-stated problems.

OBJECTS AND SUMMARY

A general object satisfied by the claimed invention is to provide a powdered beverage mixing and dispensing apparatus which accurately mixes powdered beverage substances with water to produce a desired resultant beverage.

Still a further object of the present invention is to provide a powdered beverage mixing and dispensing apparatus which reduces the intrusion of moist air and/or water vapor into storage supplies of powdered beverage substances.

Another object of the present invention is to provide a powdered beverage mixing and dispensing apparatus which prevents the formation of a bubble over an end of a dispensing nozzle.

Still another object satisfied by the present invention is to provide a powdered beverage mixing and dispensing apparatus having a stirring mechanism which stirs the powdered beverage substance retained in a storage hopper to reduce caking and clumping.

Briefly, and in accordance with the foregoing, the present invention envisions a powdered beverage mixing and dispensing apparatus which combines a powdered beverage substance and water to produce a desired beverage, for example cappuccino, hot chocolate, as well as other beverages which may be provided in powdered form. The apparatus includes at least one hopper having a powdered beverage stirring and dispensing mechanism which stirs the powder to further prevent caking and to controllably dispense a desired quantity of powder from the hopper. A water dispensing system is coupled to the apparatus to controllably dispense a quantity of water for mixing with a quantity of powder dispensed from the hopper. A mixing assembly communicates with the hopper and with the water dispensing system to combine powder. A weir is positioned in a dispensing tube to minimize the face surface of the angle of repose of the powder in the tube. A vapor removal assembly is positioned between the mixing chamber and the hopper to remove moist air from the mixing assembly to reduce intrusion of such moist air into the hopper and absorption by the beverage powder. A dispensing nozzle is attached to the mixing assembly for directing the dispensing of a beverage into a container. A tip edge of the nozzle is positioned at an angle to prevent bubble formation thereover.

BRIEF DESCRIPTION OF THE DRAWINGS

FIG. 3 is an enlarged, exploded, perspective view of a mixing assembly, which mixing assembly attaches to a powder hopper, an inlet water line, an exhaust vent, and dispenses a beverage through a dispensing nozzle which shows a weir in a dispensing tube of the mixing assembly;

FIG. 4 is an enlarged, partial fragmentary, partial cross-sectional side elevational view of a mixing assembly as shown in FIG. 2 and as shown in the exploded perspective view of FIG. 3 which shows the weir in a dispensing tube portion of the mixing assembly;

FIG. 9 is a partial fragmentary, cross-sectional, side elevational view of a door which is attached to a front portion of the beverage mixing and dispensing apparatus, which door employs an illumination source to illuminate a display panel retained on the door;

FIG. 10 is a partial fragmentary, cross-sectional, side elevational view of a portion of the door which retains the display panel in position.

DESCRIPTION

Figure 1:
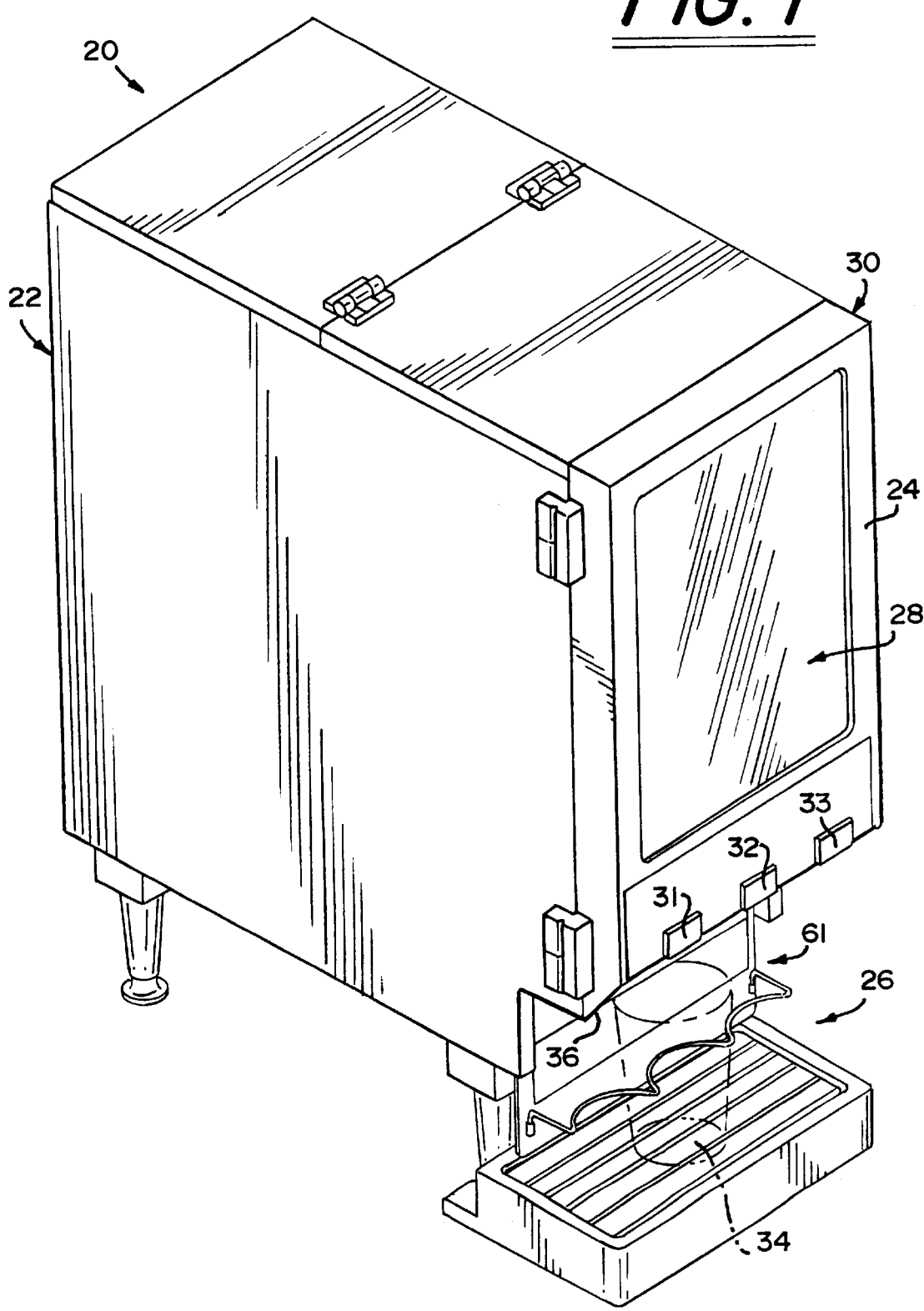
FIG. 1 is a perspective view of a powdered beverage mixing and dispensing apparatus of the present invention.

As shown in FIG. 1, a powdered beverage mixing and dispensing apparatus 20, hereinafter referred to as the beverage apparatus 20, includes a housing 22 having a front surface 24 and a beverage dispensing area 26. The front surface 24 includes an illuminated display 28 associated with a front door 30 and as will be described in greater detail herein below. Selection switches 31, 32, 33 are also provided on the front surface 24 for selecting a desired beverage for dispensing into a container or cup 34 positioned in the beverage dispensing area 26. As will be described in greater detail herein below, a lower edge of the front door 30 has a beveled surface 36 which allows an operator to view the dispensing of a beverage from the apparatus 20 into the cup 34 in the dispensing area 26.

Figure 2:
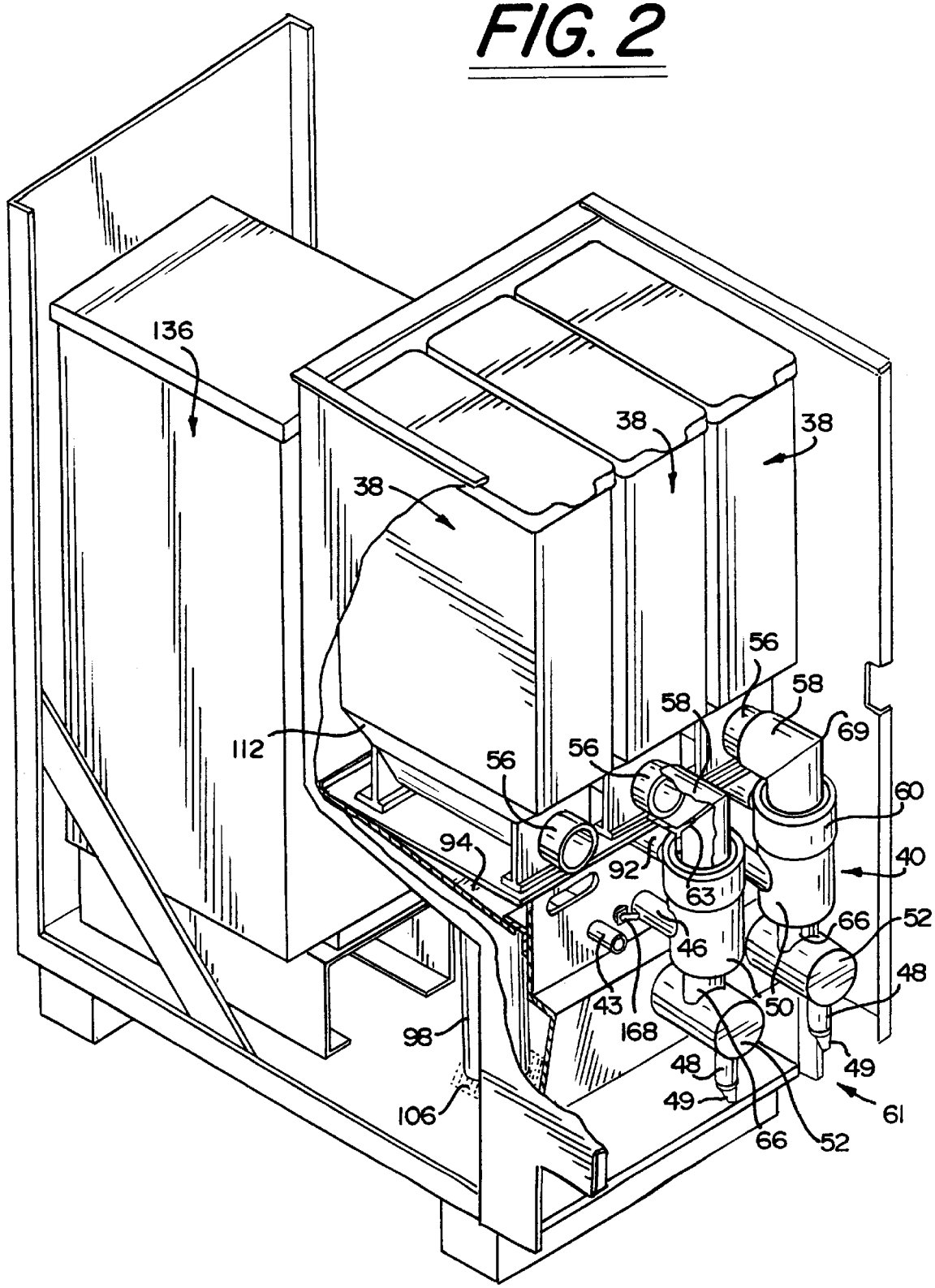
FIG. 2 is a partial fragmentary, partial cross-sectional, perspective view of internal components of the powdered beverage mixing and dispensing apparatus as shown in FIG. 1.
Figure 6:
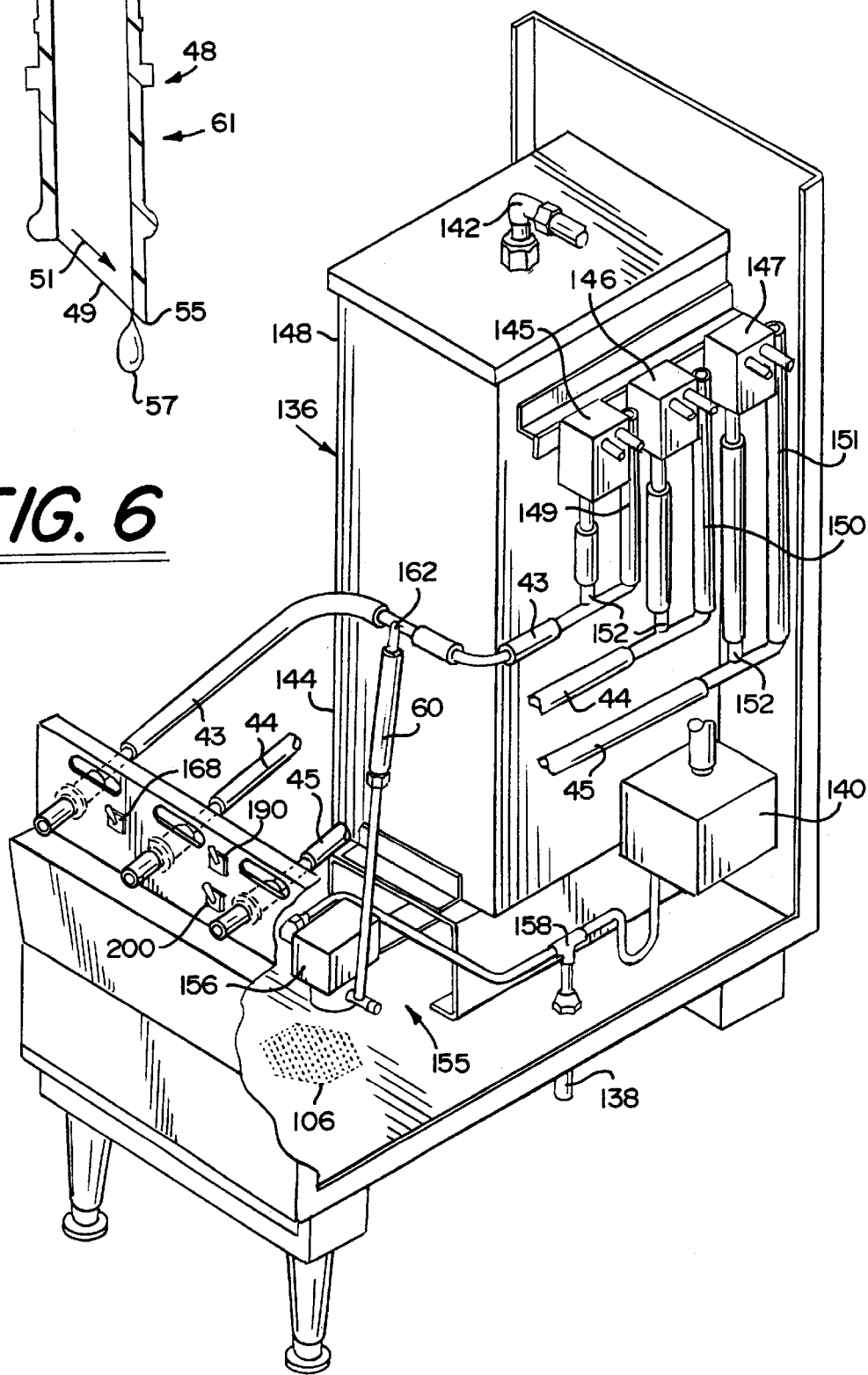
FIG. 6 is a partial fragmentary, partial cross-sectional, perspective view of a water dispensing system of the present invention which prevents the accumulation of gas bubbles in heated water dispensing lines and which promotes the draining of the heated water dispensing lines upon completion of a dispensing cycle, also shown is a water by-pass system which introduces reduced temperature water for mixing with a powdered beverage substance.

FIGS. 2 and 6 provide perspective views from two different perspective angles of the apparatus 20 with portions of panels of the housing removed. As shown in FIG. 2, the housing 22 has been fragmented to reveal three hoppers 38 in which is stored a powdered beverage substance. A mixing assembly 40 is positioned in close proximity to each of the hoppers 38. With further reference to FIG. 6, a water distribution system 42 (described in greater detail herein below) delivers water through water dispensing lines 43, 44, 45 which are coupled to inlet ports 46 of corresponding mixing assemblies 40. Powder is dispensed from the hopper 38 into a corresponding one of the mixing assemblies 40 and mixed with water from the inlet port 46. The mixture is mechanically agitated in the mixing assembly 40 and dispensed through a dispensing nozzle 48.

Figure 5:
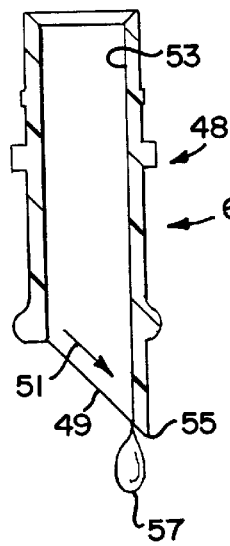
FIG. 5 is an enlarged, cross-sectional, side elevational view of a dispensing nozzle having a beveled tip.

With reference to FIG. 5, and additional reference to FIGS. 2–4, the dispensing nozzle 48 has a beveled tip 49. The beveled tip promotes the gravity flow (as indicated by gravity arrow 51 which drains any fluid passing through the bore 53 of the nozzle 48 towards a point 55 thereof). Beverage which collects on the point 55 will form drops 57 which drip into the container. The beveled tip 49 prevents the formation of a bubble over the end of the nozzle covering passage through the bore. This type of design is found in the prior art. The problem that occurs with the prior art design is that a quantity of beverage may accumulate behind the bubble causing a splash when it breaks the tension of the bubble and falls into the cup. Additionally, if a bubble forms after a dispensing cycle, it may also tend to dry forming a partial seal over the bore. During the subsequent dispensing cycle, a degree of back pressure may develop once again resulting in splashing of the beverage into the cup.

The present invention also positions the angle of the beveled tip 49 to angle forwardly and downwardly towards a front 61 of the apparatus. This helps further prevent splashing or dispersion of beverage being dispensed through the nozzle 48 from splashing towards a user positioned proximate to the front 61.

With reference to FIGS. 3 and 4, the mixing assembly 40 includes a mixing chamber 50 connected to and communicating with a whipping chamber 52. A moisture removal assembly 54 (described in greater detail herein below) is positioned between the mixing chamber 50 and the corresponding hopper 38. During a dispensing cycle, beverage powder is dispensed from the hopper 38 through a dispensing outlet 56 and a dispensing tube or an ejector elbow 58. With further reference to FIGS. 2 and 4, a weir 63 is positioned extending from an inner surface 65 of the tube 58. The weir 63 extends generally from an attachment point 67 generally towards an inside surface of an elbow 69. The weir 63 is spaced between a first end 71 and a second end 73 of the dispensing tube 58 generally positioned proximate to the elbow 69 and the second end 73. The weir 63 is positioned at an acute angle 75.

As best shown in FIG. 4, the weir 63 is angled away from the hopper 38. Powder 77 is dispensed from the hopper 38 and accumulates against the weir 63. The weir reduces the area of the leading face 79. An angle of repose 81 is defined by the powder such that powder will generally slide away from the pile of powder when it is piled at an angle greater than the angle of repose. Additionally, the weir 63 extends over the entry port 59 to partially block the tube 58. As such, the weir also reduces the potential for moisture to rise into the dispensing tube and cause the powder 77 retained therein to clump.

A moisture collector portion 60 of the moisture removal system 54 defines an entry port 59 through which powder is dispensed from the ejector elbow 58. Powder passes through the entry port 59 into the mixing chamber 50. Water is dispensed during the beverage dispensing cycle through a water dispensing line 43, 44, 45 through the inlet port 46 on the corresponding mixing chamber 50 and through a tangentially oriented entry aperture 64. The tangential entry aperture 64 introduces the water in a tangential orientation to produce and promote swirling action of the water in the mixing chamber 50. The swirling action promotes the mixing of the powder with the water and the cleansing of the mixing chamber surfaces.

The combined powder and water mixture drains from the mixing chamber 50 into the whipping chamber 52 through a chamber interface coupling 66. A frothing mechanism 68 is associated with the whipping chamber 52 to mechanically agitate the powder and water mixture. The frothing mechanism 68 assures thorough and consistent mixing of the powder and water and produces a froth on top of the resultant beverage. The frothing mechanism 68 includes a motor 70 having a shaft 72 extending into the whipping chamber 52. A frothing blade 74 is attached to a distal end of the shaft 72. The motor 70 rotates the shaft 72 and the attached frothing blade 74 to mechanically agitate the powder and water mixture. Agitation quickly and thoroughly mixes the powder and water combination to assure complete dissolving of the powder in the water. Additionally, the agitation introduces small air bubbles into the mixture which produces a froth which rises to the top of the finished beverage. Such a froth is desirable for beverages such as hot chocolate and cappuccino. The resultant beverage is dispensed from the whipping chamber 52 through the dispensing nozzle 48.

It should be noted that the shaft 72 extends through a wall 76 of the whipping chamber 52. A resilient seal 78 is provided around the shaft 72 to provide a barrier between the whipping chamber 52 and the motor 70. The seal 78 helps to keep liquid inside the whipping chamber 52 and helps to minimize leaking from the whipping chamber 52. Due to the high speed and low torque of the motor 70, the seal 78 must be provided as a low friction seal to prevent the buildup of heat and resistance on the shaft 72 and motor 70 and to prevent overloading the motor 70. However, the shaft seal 78 tends to oscillate or wiggle as the shaft 72 rotates. As a result, some liquid may leak between the seal 78 and the shaft 72. A collar 80 is provided on the shaft 72 in close proximity to, without contacting, the seal 78. The collar 80 provides a hydrodynamic seal which centripetally spins liquid away from the seal 78 and shaft 72 thus further preventing leakage of liquids between the seal 78 and shaft 72.

As briefly discussed above, the present invention also includes the moisture removal assembly 54. The moisture removal assembly 54 includes the moisture collector 60 and the exhaust assembly 84. The moisture collector 60 is positioned on an upper end 86 of the mixing chamber 50. An annular channel structure 88 is defined by the moisture collector 60 having a mouth 90 which opens towards the mixing chamber 50. As noted above, the moisture collector 60 also defines an entry port 59 generally through the center thereof. The annular channel structure 88 communicates with a vent tube 92 which, in turn, communicates with an enclosed passage 94. The passage 94 communicates with the exhaust assembly 84 which induces a positive air flow through the vent tube 92 and passage 94 to exhaust air from the mixing chamber 50. The exhaust assembly 84 includes a vent fan 96 and an exhaust tube 98.

Air (104) removed from the mixing chamber 50 is exhausted through the exhaust tube 98 externally of the apparatus 20 through a vent 106 (see FIG. 6) in a bottom portion of the apparatus housing. By exhausting the air externally of the apparatus, the moisture level inside the apparatus is maintained at a reduced level to further prevent clumping and caking of the beverage powder substance.

In operation, the vent fan 96 is activated to produce a positive air flow away from the moisture collector 60. As hot water (100) is dispensed into the mixing chamber 50, steam (102) rises upwardly from the mixing chamber 50. The positive air flow (104) created by the exhaust assembly 84 removes steam or moist air collected in the annular channel structure 88 through the vent tube 92 communicating therewith. As such, moist air is collected and removed from the mixing chamber 50 through the moisture removal assembly 54. The moisture removal assembly 54 is important because moist air is not allowed to flow through the ejector elbow 58 into the hopper 38. This novel feature of the present invention helps to minimize or eliminate clumping and caking of the beverage powder substance in the hopper 38 and thus promotes more efficient and consistent operation of the apparatus 20.

Figure 8:
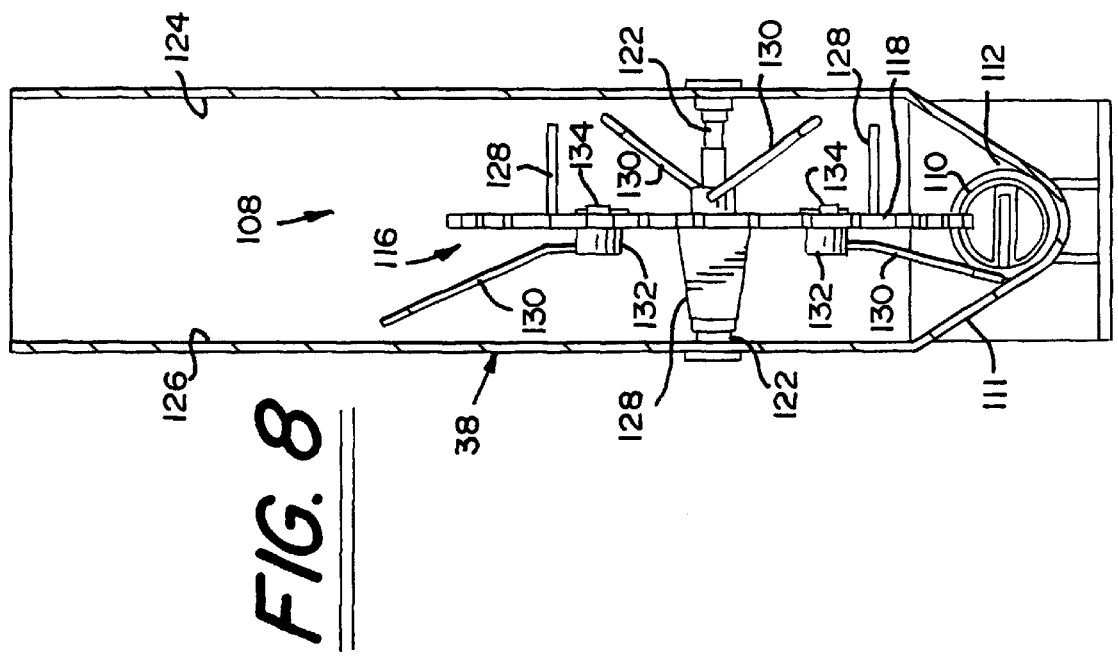
FIG. 8 is a partial fragmentary, cross-sectional, side elevational view of the hopper and stirring mechanism as shown in FIG. 7 further showing the engagement and alignment of various components within the stirring mechanism.
Figure 7:
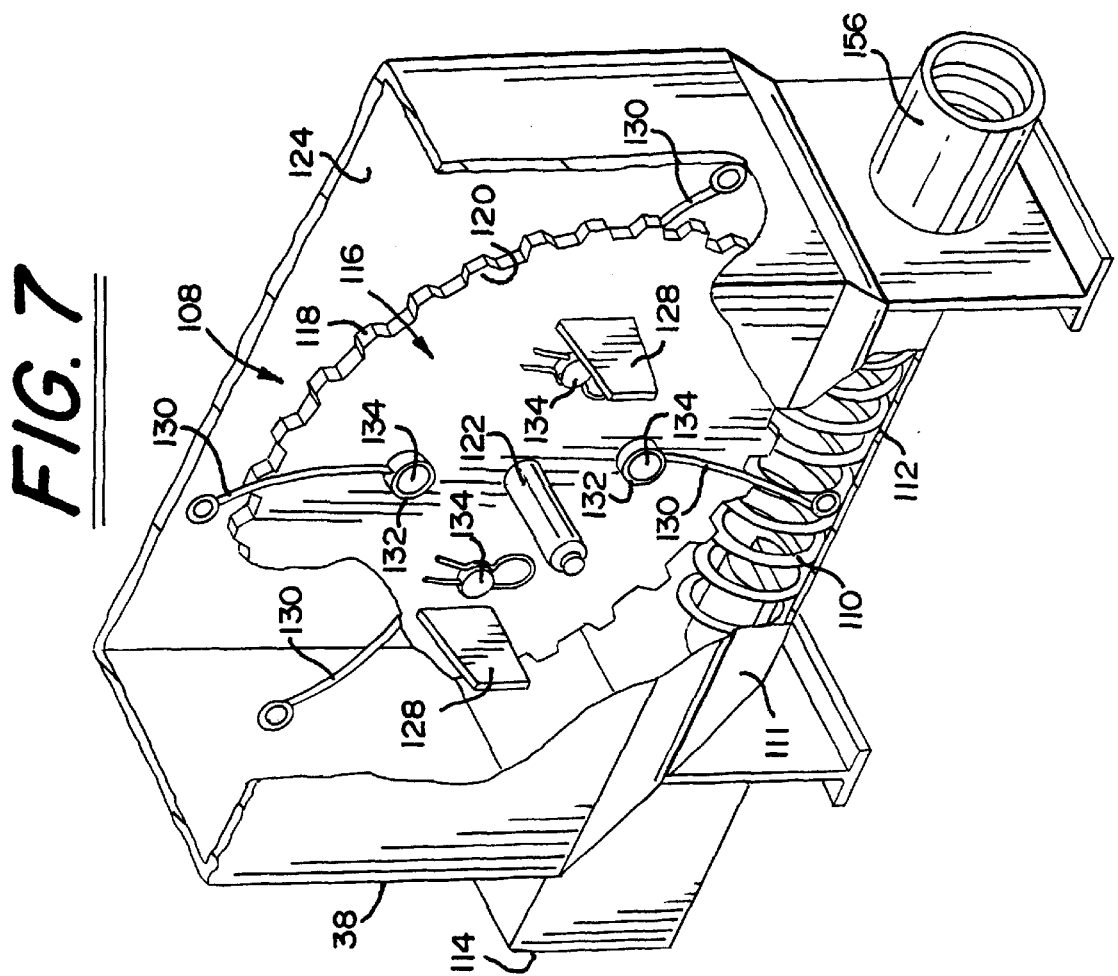
FIG. 7 is a partial fragmentary, partial cross-sectional, perspective view of a hopper of the present invention and the stirring mechanism retained within the hopper for breaking up clumps and preventing caking of a powdered beverage substance retained within the hopper.

Turning now to FIGS. 7 and 8 which provide partial fragmentary and cross-sectional views of the hopper 38 and a stirring and dispensing mechanism 108 associated therewith. Walls 124, 126 of the hopper have tapered portions 111 which inwardly directs the powder in the hopper to deliver it to the auger 110 and prevent the formation of "dead" volumes in the hopper. The tapered portions 111 define an accumulation area 112. The stirring and dispensing mechanism 108 includes an auger 110 positioned in a lower portion or accumulation area 112 of the hopper 38. An auger motor 114 positioned externally of the hopper 38 is connected to and drives the auger 110. Operation of the auger 110 advances powder in the lower portion 112 of the hopper 38 towards the dispensing outlet 56 and through the ejector elbow 58.

The stirring and dispensing mechanism 108 also includes an agitator disk 116 which is a generally planer disk having teeth 118 positioned on the circumferential edge 120 thereof. The agitator disk 116 is retained on a spring-loaded agitator axle 122 retained between the opposite sides 124, 126 of the hopper 38. Spacing of the auger spiral and the position of the teeth 118 has been sized and dimensioned such that the teeth 118 engage the auger 110. Engagement of the agitator disk 116, via the teeth 118, with the auger 110 results in rotation of the agitator disk 116 upon operation of the auger 110 by the auger motor 114. As such, operation of the auger 110 during a dispensing cycle will cause the agitator disk 116 to rotate about the axle 122 to help break up any clumping or settling of the powder retained in the hopper 38.

Additionally, the agitator disk 116 includes fins 128 which extend from the generally planer surface thereof. As shown in FIG. 7, the fins 128 extend from both sides of the agitator disk 116 generally perpendicular thereto and are spaced in alternate pairs such that the two fins 128 on one side are not spaced directly across from the two fins 128 on the other side. This alternate spacing can be seen as shown in FIGS. 7 and 8.

Still a further feature of the stirring and dispensing mechanism 108 includes agitator wires 130 which are attached to the agitator disk 116. The agitator wires 130 are bent outwardly towards the walls 124, 126, respectively. The outwardly angled wires 130 improve the agitating and mixing action of the stirring mechanism 108. A shoulder 132 is provided on the agitator disk 116 to further space each wire 130 away from the surface of the disk. A pin 134 extends through a portion of each wire 130 to secure each wire 130. The wires 130 provide a degree of flexion relative to the powder upon rotation of the disk 116. Further, the wires 130 are sufficiently long so as to extend into the path of the auger 110 thereby helping to break up clumps in the auger path and removing powder from the auger surface. This action of the agitator wires 130 helps to further promote the mixing and loosening of the powder to minimize and counteract caking.

As mentioned herein above, and as shown in FIG. 6, the apparatus 20 includes a water dispensing system 42 which dispenses water through a water dispensing line 44 to the mixing chamber 50. Water dispensed through the dispensing line 44 is retained in a heated water reservoir 136 prior to dispensing. Water is introduced to the apparatus 20 through an inlet line 138 which communicates with an inlet solenoid valve 140 to control the in-flow of water. The solenoid 140 is connected to an inlet coupling 142 which is connected to a tube extending towards a lower portion 144 of the reservoir 136. A heater (not shown) is positioned in the lower portion 144 to heat the unheated incoming water. The tube (not shown) extending through the reservoir 136 towards the lower portion 144 and the heater retained therein are of generally known construction. A series of individually controllable dispensing solenoid valves 145, 146, 147 are positioned in close proximity to and communicate with an upper portion 148 of the reservoir 136. When the solenoid valves 145, 146, 147 are operated, water flows from the upper portion 148 into the corresponding dispensing line 44. Each dispensing line is positioned on an incline from the corresponding solenoid valve 145, 146, 147 to the corresponding mixing chamber 50. As a result, water flows from the solenoid valve 145, 146, 147 when operated to the open position, towards the mixing chamber 50 under the influence of gravity.

A vent tubes 149, 150, 151 is connected to each of a corresponding dispensing lines 43, 44, 45. The vent tube 150 is connected to the corresponding dispensing line 44 at "T"-fittings 152, 153, 154. The "T"-fittings 152, 153, 154 are positioned below the dispense valves 145, 146, 147. When the dispense valve is opened, water flows from the upper portion 148 of the reservoir 136 through the valves 145, 146, 147 downwardly to the "T"s 152, 153, 154 and into the dispensing lines 43, 44, 45. By connecting the vents 149, 150, 151 to the "T"s 152, 153, 154 some water flowing through the dispense lines 43, 44, 45 will back up into the vent tubes 149, 150, 151 sealing off the vent and not allowing air to be pulled through the vents 149, 150, 151 into the dispensing line. When the dispense valve 145, 146, 147 are closed, water drains from the dispense lines 43, 44, 45 as a result of the vent tubes 149, 150, 151 communicating with the ambient atmosphere.

Without the vent, hot water would be trapped in the dispense lines 43, 44, 45. As the heated water cooled, small air bubbles from the heated water may evolve from the water and collect into larger bubbles. The large bubbles may create blockage in the dispensing line creating turbulence on a subsequent dispensing cycle. The increased turbulence in the dispense line will reduce the flow rate regardless of the valve settings and thus create inconsistent flow. The inconsistent flow will result in inconsistent quantities of water being dispensed into the mixing chamber and thus inconsistent resultant beverages. Some prior art devices, as mentioned hereinabove, have attempted to resolve the bubble problem by adding a vent in the dispensing valve. The vent consists of a hole drilled into a side of the valve near a diaphragm seat of the valve. The vent, however, in the prior art devices, acts as a venturi which draws air into the liquid in the dispensing line and, as a result, creates inconsistent flow.

As a further consideration in the water dispensing system 42 of the present invention, a by-pass water system 155 is provided to introduce unheated water into at least one dispensing line 43. Although FIG. 6 shows the by-pass water system 155 introducing unheated water into only one dispensing line 43, it should be appreciated that multiple systems may be provided to introduce unheated water into each dispensing lines 43, 44, 45. The by-pass water system 155 includes a by-pass solenoid valve 156 which communicates with the inlet line 138 by way of an inlet "T" connection 158. The valve 156 is also connected to a by-pass line 160 which is connected to the dispensing line 44 by way of a by-pass "T" 162. Additionally, an adjustment valve 166 in the form of a needle valve is positioned between the by-pass line 160 and the solenoid valve 156. The adjustment valve 166 allow for control of the flow rate of the by-pass water through the by-pass line 160 when the solenoid 156 is operated.

In use, the by-pass water system 155 allows unheated water to flow into the mixing assembly 50. In the embodiment as shown in FIG. 6, a toggle switch 168 is provided to activate the by-pass solenoid valve 156. The toggle switch is coupled to the corresponding dispensing valve 145 so that when a dispensing cycle is initiated, water will flow directly from the inlet line 138 through the by-pass water system 155 to the dispensing line 43. In this manner, unheated water is introduced to the mixing chamber 50 and the dispense valve 145, disabled by the toggle switch 168, will not allow heated water to flow from the heated water reservoir 136. If unheated beverages are desired from all of the selection points, the heater (not shown) can be deactivated, thereby resulting in the reservoir being an unheated water reservoir. The dispense valves 145, 146, 147 will operate in the usual manner.

With further reference to FIGS. 1, 4, 9 and 10, the illuminated display 28 on the front surface 24 of the front door 30 is shown. As shown in FIG. 9, the illuminated display 28 includes a display panel 170 positioned over a window 172 formed in a frame structure 174 of the door 30. A lamp assembly 176 is retained within the frame structure 174 to provide illumination from a back side of the display panel 170. With reference to FIG. 10, a protective panel 178 of a transparent material such as plastic or glass may be provided over the window to protect the display panel 170.

The panel 178 and display 170 are clamped in position by a mounting structure 180 secured to an inside surface of the frame 174 and a window clamp 182 attachable to the mounting structure 180. The removable clamp 182 allows the display panel 170 to be removed and replaced to provide a variety of displays or to change displays for advertising purposes. The lamp assembly 176 includes a lamp fixture 184 and a lamp element 186 in the form of a fluorescent tube. The illuminated display panel of the present invention is important to provide an active mechanism to draw a patron's attention to the powdered beverage mixing and dispensing apparatus in the interest of enticing selection and purchase of beverages.

Figure 11:
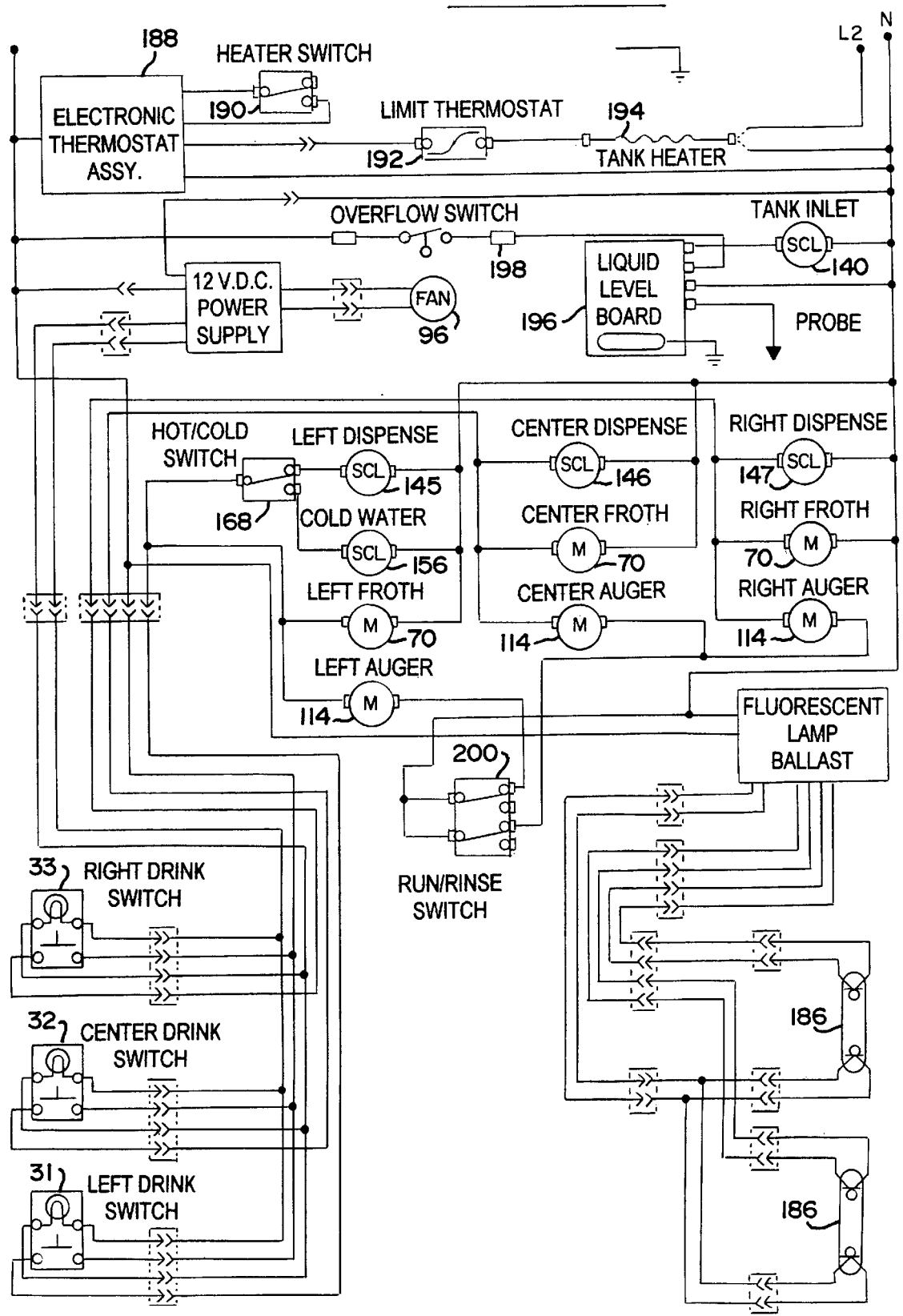
FIG. 11 is a schematic diagram of the invention.

Having now described the overall structures and functions of the present invention, we turn to FIG. 11 which is the schematic diagram of the present invention. In use, the water dispensing system 42 includes an electronic thermostat assembly 188 which is coupled to a heater switch 190. When the heater switch 190 is activated, the thermostatic assembly 188 and the limit thermostat 192 are active and a tank heater 194 is activated. The tank heater 194 is retained within the heated water reservoir 136 and heats the water retained therein.

The inlet solenoid valve 140 is coupled to a liquid level board 196 which is also coupled to an overflow switch 198. In the event that an overflow condition occurs in the reservoir 136, the overflow switch 198 will prevent the overflow condition and thus deactivate the inlet solenoid 140 to prevent continued or excessive overflow. If the heater switch 190 is deactivated, the tank heater 194 is also deactivated and the water retained in the reservoir 136 will be unheated water as opposed to heated water. The unheated water from the reservoir will allow an unheated or cold water beverage to be produced. However, selection of the unheated reservoir supply will require considerable heat-up time if heated beverages are desired.

A run/rinse switch 200 is provided to selectively operate the auger motor 114. In the "run" mode, the auger motor 114 will operate when the corresponding switch 31, 32, 33 is activated. In this condition, the hopper motor is connected to a timer/power supply board. The timer acts as a time delay for the auger motor 114, delaying the start of the activation of the auger motor 114 approximately 0.75 seconds after activation of the switch 31, 32, 33. The time delay allows water to be dispensed by the corresponding solenoid 145, 146, 147 into the mixing chamber 50. Dispensing water into the chamber before dispensing powder will help to assure that all of the powder dispensed into the chamber will be thoroughly mixed and that the walls will be wetted to thoroughly rinse the powder into the whipping chamber.

When the run/rinse switch 200 is in the "rinse" mode, the auger motor 114 will not be activated when the corresponding switch 31, 32, 33 is activated. This mode is used to rinse heated water through the mixing and whipping chambers 50, 52 for cleaning these chambers. Periodic rinsing of these chambers will help prevent accumulation of beverage therein and maintain sanitary conditions.

Additionally, the run/rinse switch 200 may be used to rinse a corresponding mixing assembly 40 and to dispense hot water therefrom after rinsing any remaining beverage therefrom. In this regard, the apparatus may also dispense heated water.

While a preferred embodiment of the present invention is shown and described, it is envisioned that those skilled in the art may devise various modifications and equivalents without departing from the spirit and scope of the invention as defined by the appended claims. The invention is not intended to be limited by the foregoing disclosure.

I claim:

1. A powdered beverage mixing and dispensing apparatus having a housing containing at least one powdered beverage substance hopper for retaining a powdered beverage substance;

a powder stirring and dispensing mechanism coupled to said hopper for stirring the powdered beverage substance within the hopper and dispensing the powdered beverage substance from the hopper;

a heated water dispensing system to controllably dispense a desired quantity of heated water for combination with a quantity of dispensed powdered beverage substance;

a mixing assembly communicating with said at least one hopper for receiving powdered beverage substance dispensed therefrom and communicating with said heated water dispensing system for mixing said powdered beverage substance and heated water to produce a beverage;

a dispensing tube having a weir positioned therein, said dispensing tube communicating with said hopper and said mixing assembly to direct powder dispensed from said hopper into said mixing assembly, said weir reducing the size of a leading face of powder retained in said tube;

a moisture removal assembly positioned between said at least one hopper and said mixing assembly for removing moisture produced by heated water mixed in said mixing assembly to reduce intrusion of said removed moisture into said powdered beverage substance retained in said at least one hopper;

a dispensing nozzle attached to said mixing assembly for directing the flow of beverage mixed therein to a container, a beveled tip of said dispensing nozzle for preventing formation of a bubble thereover; and a controllable by-pass water system communicating with said heated water dispensing system for introducing unheated water into said mixing assembly for mixing with said powdered beverage substance to selectively produce unheated beverages.

2. A powdered beverage mixing and dispensing apparatus as recited in claim 1, further comprising:

said weir being angled in a direction of the path of travel of said powder through said dispensing tube.

3. A powdered beverage mixing and dispensing apparatus as recited in claim 1, wherein said beveled tip of said dispensing nozzle is angled downwardly towards a face of said apparatus to minimize dispersion of beverage dispensed therethrough towards a patron positioned proximate to the face of said apparatus.

4. A powdered beverage mixing and dispensing apparatus as recited in claim 1, said powder stirring and dispensing mechanism further comprising:

an auger positioned in a lower portion of said hopper; and a motor connected to said auger for rotating said auger to move powdered beverage substance through said hopper towards said dispensing tube.

5. A powdered beverage mixing and dispensing apparatus as recited in claim 4, further comprising: an agitator disk positioned in said hopper having teeth positioned on a circumferential edge thereof for engagement with said auger, operation of said auger by said auger motor moving said agitator disk having said teeth engaged with said auger to rotate said agitator disk in said powdered beverage substance.

6. A powdered beverage mixing and dispensing apparatus as recited in claim 5, said agitator disk further comprising:

at least one fin attached to said agitator disk extending from a plane of rotation of said agitator disk.

7. A powdered beverage mixing and dispensing apparatus as recited in claim 5, said agitator disk further comprising:

at least one fin attached to said agitator disk extending from a plane of rotation of said agitator disk.

8. A powdered beverage mixing and dispensing apparatus as recited in claim 4, said agitator disk further comprising:

at least one agitator wire attached to and movable relative to said agitator disk, said agitator wire being retained on said disk and spaced therefrom, said agitator wire having a dimension facilitating extension from said attachment point to beyond the circumferential edge of said agitator disk for engagement with said auger.

9. A powdered beverage mixing and dispensing apparatus as recited in claim 4, further comprising: an agitator disk positioned in said hopper having teeth positioned on a circumferential edge thereof for engagement with said auger, operation of said auger by said auger motor moving said agitator disk having said teeth engaged with said auger to rotate said agitator disk in said powdered beverage substance.

10. A powdered beverage mixing and dispensing apparatus as recited in claim 9, said agitator disk further comprising:

at least one agitator wire attached to and movable relative to said agitator disk, said agitator wire being retained on said disk and spaced therefrom, said agitator wire having a dimension facilitating extension from said attachment point to beyond the circumferential edge of said agitator disk for engagement with said auger.

11. In combination with a powdered beverage mixing and dispensing apparatus, a dispensing nozzle comprising:

a first end attached to said apparatus and receiving a beverage therefrom;

a second free end spaced apart from said first end positioned for directing a beverage dispensed through said dispensing nozzle into a container; and a beveled tip on said second free end for preventing bubble formation over a bore of said dispensing nozzle, wherein said beveled tip generally provides a single bevel angle extending substantially fully across said second free end and is angled downwardly towards a face of said apparatus to minimize dispersion of a beverage dispensed therefrom towards a user positioned proximate to said face of said apparatus.

12. A powdered beverage mixing and dispensing apparatus, said apparatus including at least one hopper for retaining a quantity of powdered beverage substance therein, two opposed walls of said hopper having a lower portion tapering inwardly to define an accumulation area; an auger positioned in accumulation area of said hopper and attached to an auger motor for moving powdered beverage substance through accumulation area of said hopper toward a dispensing outlet in said hopper for controllably dispensing a desired quantity of powdered beverage substance from said hopper, and a stirring mechanism engaged with the auger including a disk retained in said hopper having teeth along a circumferential edge thereof engageable with said auger, at least one agitator wire attached to and spaced away from said agitator disk, and wherein movement of said auger by said auger motor rotates said agitator disk and said agitator wire retained thereon in said hopper to agitate said powdered beverage substance retained therein.

13. A powdered beverage mixing and dispensing apparatus as recited in claim 12, said agitator disk further comprising:

at least one fin attached to said agitator disk extending from a plane of rotation of said agitator disk.

14. A powdered beverage mixing and dispensing apparatus as recited in claim 12, further comprising:

said agitator wire having a dimension facilitating extension from said attachment point to beyond the circumferential edge of said agitator disk for engagement with said auger.

15. A powdered beverage mixing and dispensing apparatus as recited in claim 12, said agitator disk further comprising:

at least one fin attached to said agitator disk extending from a plane of rotation of said agitator disk; and at least two agitator wires attached to and spaced away from said agitator disk, said agitator wires being retained on opposite sides of said disk, said agitator wires having a dimension facilitating extension from said attachment point to beyond the circumferential edge of said agitator disk for engagement with said auger.

16. A powdered beverage mixing and dispensing apparatus having a housing containing at least one powdered beverage substance hopper for retaining a powdered beverage substance;

a powder stirring and dispensing mechanism coupled to said hopper for stirring the powdered beverage substance within the hopper and dispensing the powdered beverage substance from the hopper;

a heated water dispensing system to controllably dispense a desired quantity of heated water for combination with a quantity of dispensed powdered beverage substance;

a mixing assembly communicating with said at least one hopper for receiving powdered beverage substance dispensed therefrom and communicating with said heated water dispensing system for mixing said powdered beverage substance and heated water to produce a beverage;

a dispensing tube having a weir positioned therein, said dispensing tube communicating with said hopper and said mixing assembly to direct powder dispensed from said hopper into said mixing assembly, said weir reducing the size of a leading face of powder retained in said tube;

a moisture removal assembly positioned between said at least one hopper and said mixing assembly for removing moisture produced by heated water mixed in said mixing assembly to reduce intrusion of said removed moisture into said powdered beverage substance retained in said at least one hopper;

a dispensing nozzle attached to said mixing assembly for directing the flow of beverage mixed therein to a container, a beveled tip of said dispensing nozzle for preventing formation of a bubble thereover; and a vent tube communicating with said heated water dispensing system for minimizing the accumulation of gas bubbles in a heated water dispensing line of said heated water dispensing system, said vent tube being configured with respect to said heated water dispensing line such that water flowing through the dispensing line backs up into the event tube thereby sealing off the vent tube wherein said vent tube drains through said heated water dispensing line at the completion of a dispensing cycle thereby providing consistent quantities of water dispensed.

17. A powdered beverage mixing and dispensing apparatus as recited in claim 16, further comprising:

said weir being angled in a direction of the path of travel of said powder through said dispensing tube.

18. A powdered beverage mixing and dispensing apparatus as recited in claim 16, wherein said beveled tip of said dispensing nozzle is angled downwardly towards a face of said apparatus to minimize dispersion of beverage dispensed therethrough towards a patron positioned proximate to the face of said apparatus.

19. A powdered beverage mixing and dispensing apparatus as recited in claim 16, said powder stirring and dispensing mechanism further comprising:

an auger positioned in a lower portion of said hopper; and a motor connected to said auger for rotating said auger to move powdered beverage substance through said hopper towards said dispensing tube.

20. A powdered beverage mixing and dispensing apparatus including at least one powdered beverage substance hopper for retaining a powdered beverage substance therein, a powdered beverage dispensing mechanism coupled to said hopper for dispensing powdered beverage therefrom;

a mixing assembly positioned proximate to said at least one hopper for receiving powdered beverage substance dispensed therefrom for mixing said powdered beverage substance with water to produce a beverage;

an angled tube having a first end communicating with a dispensing outlet of said hopper and a second end communicating with said mixing chamber, said angled tube defining an elbow therein between said first end and said second end;

a weir positioned in said tube between said first end and said second end reducing the size of a leading face of powder retained in said tube; and said powdered beverage dispensing mechanism including an auger positioned in said hopper and attached to an auger motor for moving powdered beverage substance through said hopper toward said dispensing outlet in said hopper for controllably dispensing a desired quantity of powdered beverage substance from said hopper, and a stirring mechanism engaged with the auger including a disk retained in said hopper having teeth along a circumferential edge thereof engagable with said auger, and an agitator wire on said disk and having a dimension facilitating extension beyond the circumferential edge of said agitator disk wherein operation of said auger by said auger motor rotates said agitator disk and said agitator wire retained thereon in said hopper to agitate said powdered beverage substance retained therein.

21. A powdered beverage mixing and dispensing apparatus as recited in claim 20, said weir being angled away from said first end to define an acute angle with an inside surface of said angled tube relative to an attachment point of said weir in said tube.

* * * * *

UNITED STATES PATENT AND TRADEMARK OFFICE
CERTIFICATE OF CORRECTION

PATENT NO. : 5,927,553
DATED : July 27, 1999
INVENTOR(S) : David F. Ford

It is certified that error appears in the above-identified patent and that said Letters Patent is hereby corrected as shown below:

Column 12, Line 34 "event" should be --vent --

Column 12, Line 35 "said vent tube " should be -- the water in the vent tube --

Signed and Sealed this

First Day of February, 2000

*Attest:*

Q. TODD DICKINSON

*Attesting Officer*    Acting Commissioner of Patents and Trademarks